United States Patent [19]

Bala et al.

[11] Patent Number: 4,908,619
[45] Date of Patent: Mar. 13, 1990

[54] AIRCRAFT STALL WARNING SYSTEM

[75] Inventors: Paul F. Bala, Issaquah; Edgars A. Kupcis, Redmond; William B. Fisher, Bellevue, all of Wash.

[73] Assignee: The Boeing Company, Seattle, Wash.

[21] Appl. No.: 671,134

[22] Filed: Nov. 13, 1984

[51] Int. Cl.$^4$ .............................................. G08B 23/00
[52] U.S. Cl. .................................. 340/966; 244/187; 340/967
[58] Field of Search ................ 340/959, 963, 966–969, 340/974, 975, 978, 973; 73/178 T, 180; 364/433–435, 463; 244/187, 182, 194

[56] References Cited

U.S. PATENT DOCUMENTS

| | | | |
|---|---|---|---|
| 3,686,936 | 8/1972 | Daudt, Jr. ............................... | 73/180 |
| 3,839,699 | 10/1974 | Heinsohn et al. ..................... | 340/966 |
| 4,027,839 | 6/1977 | Quinlivan ............................. | 340/966 |
| 4,093,158 | 6/1978 | Clews et al. .......................... | 340/974 |
| 4,230,290 | 10/1980 | Townsend et al. ................... | 340/967 |
| 4,235,104 | 11/1980 | Hoadley et al. ...................... | 73/180 |
| 4,347,572 | 8/1982 | Berwick, Jr. et al. ............... | 364/433 |
| 4,467,429 | 8/1984 | Kendig ................................ | 340/967 |

Primary Examiner—Joseph A. Orsino
Assistant Examiner—Brent A. Swarthout
Attorney, Agent, or Firm—James P. Hamley; B. A. Donahue

[57] ABSTRACT

A stall warning "stick shaker" reference level signal is produced as a function of both flap position and total aircraft thrust. More specifically, a correction term $\Delta\alpha$ is combined with a standard stick shaker reference level signal which is scheduled as a function of aircraft flap position. The $\Delta\alpha$ signal is scheduled as a function of the total aircraft gross thrust coefficient. The resultant reference level signal produces advance stall warnings that are essentially invariant with engine power level.

9 Claims, 3 Drawing Sheets

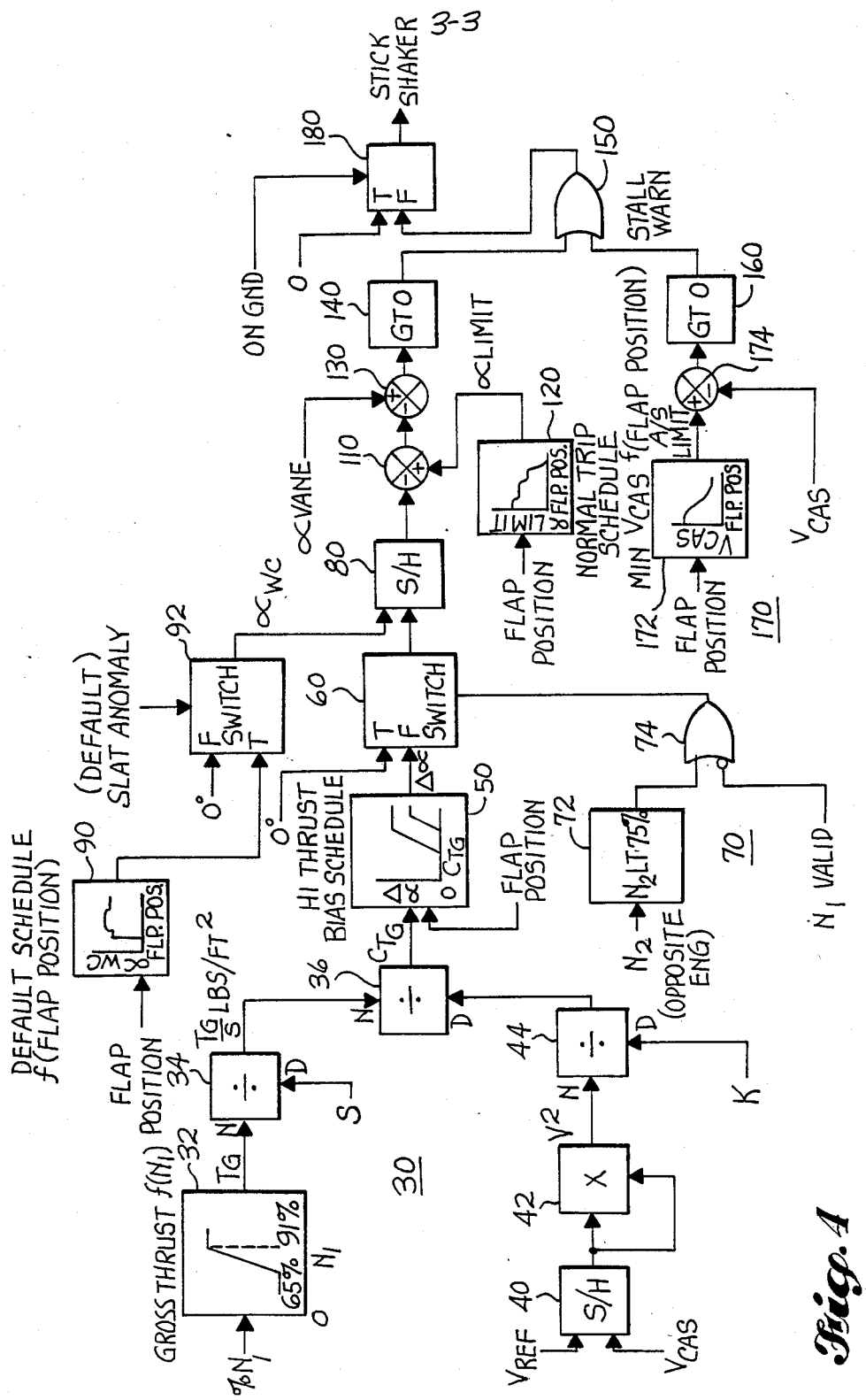
Fig. A

AIRCRAFT STALL WARNING SYSTEM

BACKGROUND OF THE INVENTION

The present invention pertains to the aircraft control art and, more particularly, to an improved system for producing an aircraft stall warning signal.

The low speed aerodynamic performance of aircraft is typically based upon stall speeds determined from stall tests which are conducted with the aircraft's engines set at idle power. The idle power test is done because this condition provides the highest, and thus most conservative, stall speed. The idle power stall speeds are then used as the basis for setting the normal operational speeds of the aircraft at all power settings. The minimum usable speed within the normal flight envelope of the aircraft is the stall warning speed. By regulation, the minimum flight envelope speed for an aircraft must be at least 7% above the demonstrated stall speed.

The pilot of the aircraft is typically warned that the craft is approaching a stall condition by "stick shaker" action on his column. In modern commercial aircraft, the stick shaker condition is triggered by the angle of attack of the aircraft, as determined by an angle of attack vane, approaching the stall warning speed level. The pilot is trained to react to the stall warning by pushing forward on the control column to regain speed and thus avoid inadvertent aircraft stall.

A significant reduction in stall speed is encountered as the aircraft's engine power is increased. This is primarily due to the additional lift provided by the component of thrust acting in the lift direction on the aircraft. This effect is most pronounced for aircraft configurations having a high thrust-to-weight ratio. At landing flap settings, where thrust coefficients are high due to the low airspeeds attainable, full power stall speeds may be 10-15 knots lower than the idle power demonstrated stall speeds. This effect is illustrated in FIG. 1 which is a graph illustrating the relationship of aircraft lift coefficient $C_L$ to the aircraft angle of attack, $\alpha$. Graph 12 plots the lift coefficient $C_L$ with the engine set at idle thrust. The stall condition is indicated at the peak of graph 12. To prevent the aircraft from actually flying to a stall condition, the stall warning, $\alpha_{stall\ warning}$, is established at a lower angle of attack, as indicated.

Graph 14 illustrates the aircraft's coefficient of lift under maximum engine thrust. If the same stall warning angle of attack is used under maximum thrust conditions, it is apparent that the stall warning will be given at warning speeds which are lower than the idle power demonstrated stall speed. As such, undesirable excursions outside of the aircraft's usable speed envelope are possible since no advance warning is provided.

There is a need in the aircraft control art, therefore, to provide a stall warning system which produces an advance stall warning signal that is essentially independent of aircraft engine thrust level.

SUMMARY OF THE INVENTION

The present invention, therefore, is directed to an improved stall warning system in which a compensation signal, $\Delta\alpha$, that is a function of engine thrust, is used to modify the stall warning signal such that an advance warning signal is produced which provides a stall warning that is essentially invariant with engine thrust.

Briefly, according to the invention, apparatus for producing an aircraft stall warning signal comprises a means for producing a first signal $\alpha$ which is representative of the aircraft angle of attack. A second signal, $\Delta\alpha$, which is predeterminedly related to engine thrust level is produced by $\Delta\alpha$ means. A comparator compares the $\alpha$ and $\Delta\alpha$ signals and produces a stall warning signal in response to a predetermined relationship therebetween.

Preferably, the $\Delta\alpha$ means includes means for producing a signal $C_{TG}$ which is representative of aircraft gross thrust coefficient. The $\Delta\alpha$ signal is scheduled as a predetermined function of the $C_{TG}$ gross thrust coefficient signal.

BRIEF DESCRIPTION OF THE DRAWINGS

FIG. 4 is a detailed block diagram illustrating the preferred implementation of the improved stall warning system.

DETAILED DESCRIPTION

As described above, FIG. 1 is a graph illustrating aircraft stall speed profiles. Plotted is aircraft lift coefficient, $C_L$, versus aircraft angle of attack, $\alpha$. Two graphs appear in this figure. Graph 12 is the lift profile for an aircraft at idle thrust. Identified at the peak of this graph is the aircraft's lift coefficient at stall. To assure a stall warning in advance of this stall condition, the minimum usable aircraft speed has been set at an advance angle of attack, indicated in FIG. 1 as $\alpha_{stall\ warning}$.

Figure 1:
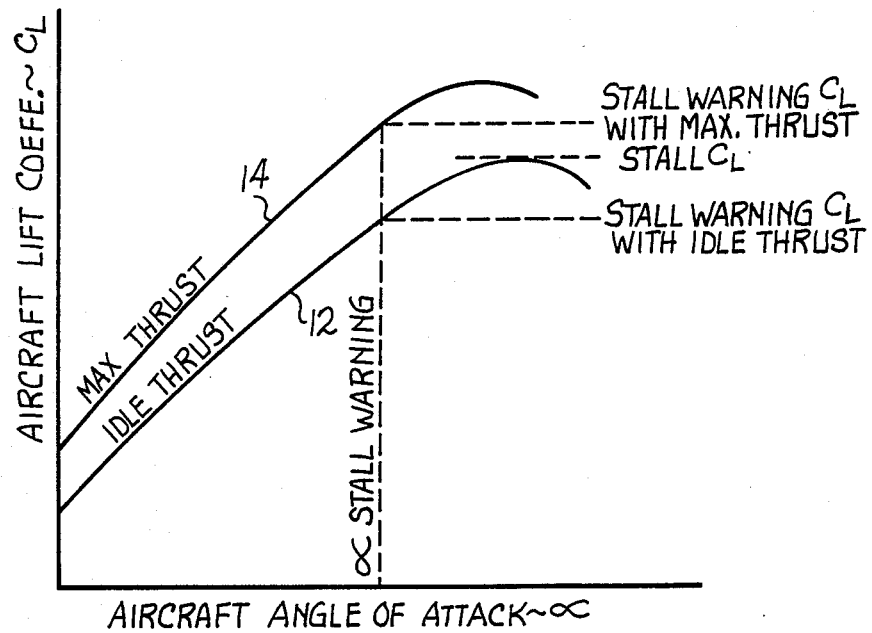
FIG. 1 is a graph which plots aircraft lift coefficient vs. angle of attack for both idle and maximum thrust engine conditions and illustrates the inadequacy of the standard stall warning signal.

The inadequacy of the conventional advance lift warning is illustrated by the graph 14 which plots the aircraft lift profile at maximum engine thrust. At full engine thrust, the additional lift provided by the component of thrust acting in the lift direction significantly reduces aircraft stall speed. In high thrust-to-weight ratio aircraft configurations, this effect is particularly pronounced. For landing flap settings in which thrust coefficients are high due to the low airspeeds attainable, the full power stall speed as illustrated in FIG. 1 can be 10-15 knots lower than the idle power demonstrated stall speed. As a result, in the full thrust condition the stall warning speed is lower than the idle power demonstrated stall speed. The pilot does not, therefore, receive a stall warning until his speed is actually lower than the demonstrated stall speed. Consequently, excursions outside the usable aircraft speed envelope are possible. This could provide critical since the handling characteristics of the aircraft may seriously deteriorate below the envelope usable speed level.

To remedy the above discussed problem, the present improved stall warning system develops a signal which is based on engine power setting. To preserve normal speed margins between the stall warning speed and the demonstrated stall speed at all power settings, the present invention incorporates a stall warning schedule which automatically provides an advanced stall warning with increasing engine power. As a result, the present improved stall warning system provides advanced stall warnings to prevent speed excursions outside of the usable aircraft speed envelope at all engine power settings.

The preferred embodiment of the invention is directed to a stall warning system which employs a control column "stick shaker" which is triggered by an angle of attack vane signal to alert the pilot of a near stall condition. A device in accordance with the present invention automatically adjusts the vane angle trigger point to a lower setting with increasing engine thrust coefficient.

Figure 2:
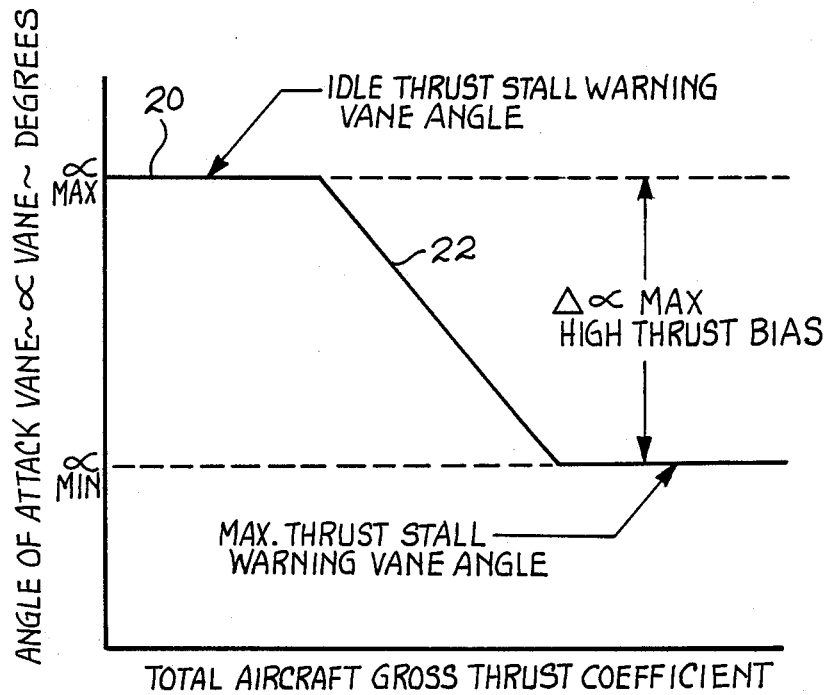
FIG. 2 is a graph of aircraft vane angle of attack vs. total aircraft gross thrust coefficient and illustrates the preferred scheduling for the signal $\Delta\alpha$.

FIG. 2 is a graph of aircraft vane angle of attack a vs. the total aircraft gross thrust coefficient, $C_{TG}$. Aircraft gross thrust coefficient is defined as:

$$C_{TG} = \frac{\text{Total Gross Thrust}}{\text{Dynamic Pressure} \times \text{Wing Area}}.$$

Graph 20 in FIG. 2 sets forth the preferred schedule of vane angle vs. thrust coefficient used to implement the present invention. The vane angle a for relatively low thrust coefficients is identified as $\alpha_{max}$ and corresponds to the standard idle thrust stall warning vane angle. At very high gross thrust coefficients, the stall warning bias remains constant at a minimum value, $\alpha_{min}$. Thus, the maximum signal, $\Delta\alpha$ which need be applied to the idle thrust stall warning vane angle signal $\alpha_{max}$ is the $\Delta\alpha_{max}$ signal as illustrated. The present invention develops the $\Delta\alpha$ signal to correct the $\alpha_{max}$ idle thrust stall warning signal to the schedule as shown in FIG. 2.

Extending between the maximum and minimum stall warning levels $\alpha_{max}$, $\alpha_{min}$, respectively, is the active bias schedule 22. As shown, in the preferred embodiment of the invention the active region 22 is linear. The active region 22 of the $\Delta\alpha$ schedule selected for a particular aircraft depends upon several variables. First, the schedule 22 should be selected to provide good aircraft handling capabilities into stall at all thrust settings. Also, the schedule 22 should be selected in accordance with prudent design for aircraft handling during windshear conditions. In addition, the schedule 22 should minimize nuisance trips, i.e., stick shaker indications which do not represent a near stall condition.

Figure 3:
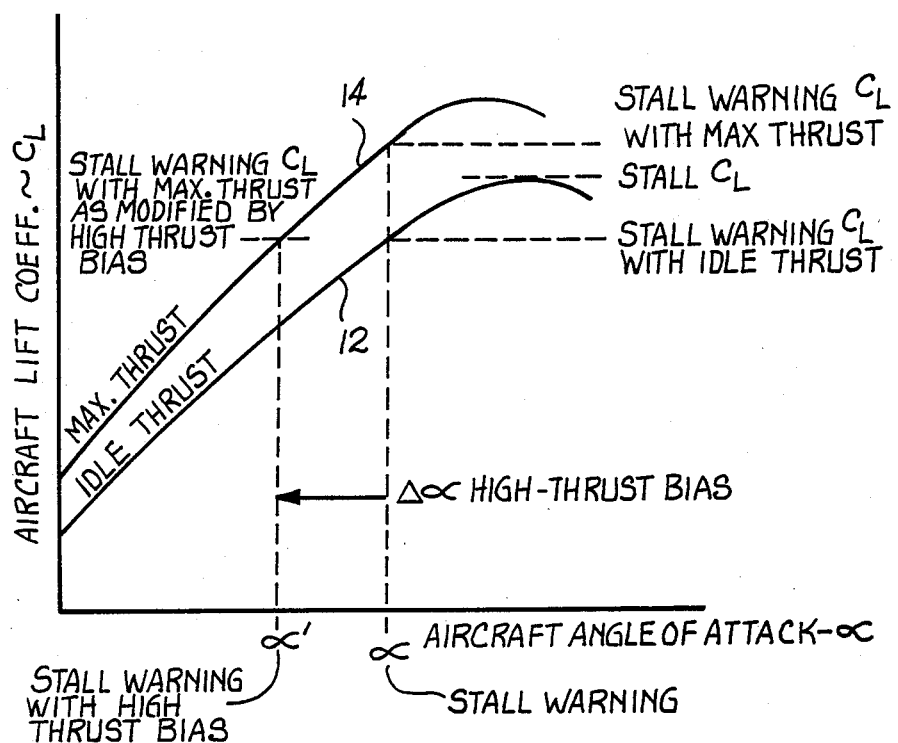
FIG. 3 is a graph of aircraft stall profiles similar to FIG. 1, but here illustrating the use of the $\Delta\alpha$ signal to provide an advance stall speed warning which is essentially invariant with engine thrust level.

FIG. 3 is a graph, similar to the graph of FIG. 1, but illustrating the revised stall warning level at high engine thrust due to implementation of the signal $\Delta\alpha$. As with FIG. 1, graph 12 illustrates the lift profile of an aircraft with its engines at an idle thrust setting. The stall condition is indicated at the peak of this graph. To provide a predetermined advance stall warning, the aircraft stick shaker is activated at an indicated angle of attack $\alpha_{stall}$ warning.

Graph 14 depicts the aircraft stall profile at maximum engine thrust. If the stall warning level $\alpha_{stall\ warning}$ is used for the maximum thrust condition of graph 14, it is seen that the stall warning speed is less than the demonstrated stall speed. As such, no advance warning is provided.

When the stall warning signal $\alpha_{stall\ warning}$ is modified by the signal $\Delta\alpha$ in accordance with the schedule of FIG. 2, a new stall warning level is established, as indicated at $\alpha'_{stall\ warning}$ with high thrust bias. The use of the $\Delta\alpha$ signal modifies the vane angle warning signal $\alpha_{stall\ warning}$ such that the stick shaker stall warning level is essentially invariant with engine power, and thus provides advance stall warning at all power settings.

FIG. 4 is a detailed block diagram setting forth the preferred apparatus for realizing the improved aircraft stall warning system. As stated hereinabove, the signal $\Delta\alpha$ is scheduled as a function of aircraft gross thrust coefficient, $C_{TG}$, where:

$$C_{TG} = \frac{\text{Total Gross Thrust}}{\text{Dynamic Pressure} \times \text{Wing Area}}.$$

The circuitry indicated generally at 30 develops the $C_{TG}$ signal.

Applied to the input of a block 32 is a signal %$N_1$, which is a commonly available signal in a turbine engine aircraft and corresponds to the percentage of maximum thrust being produced by the engine. Over a defined active range (65%–91% max thrust for the engine of the preferred embodiment) the gross thrust developed by the engine is directly proportional to the %$N_1$ signal. Thus, the output from the gross thrust block 32 is a signal $T_G$ which represents the gross thrust being produced by the aircraft's first engine.

The signal $T_G$ is passed to the numerator input of a divider block 34. Applied to the denominator input of divider block 34 is a signal s which corresponds to the aircraft's wing area. Thus, the signal out of divider block 34 has the form $T_{G/s}$. This signal is applied as the numerator input to a divider block 36.

Applied to the inputs of a "SELECT HIGH" block 40 are a reference signal $V_{REF}$ and a calibrated airspeed signal $V_{CAS}$. The signal $V_{CAS}$ corresponds to the aircraft's actual calibrated airspeed. The signal $V_{REF}$ is selected to prevent a subsequent divide by 0, and also to allow a desired maximum advance level. The larger of the signals applied to the input of SELECT HIGH block 40 is passed to a squarer circuit 42. The output from squarer circuit 42 is, thus, a signal having a level $V^2$.

The signal $V^2$ out of squarer block 42 is passed to the numerator input of a divider block 44. Applied to the denominator input of divider block 44 is a constant, k, which converts calibrated airspeed squared to dynamic pressure.

The signal out of divider block 44 is representative of dynamic pressure, and given the symbol q. The signal q is passed to the denominator input of divider block 36.

The signal developed at the output of divider block 36 is, therefore, the aircraft's gross thrust coefficient $C_{TG}$.

The gross thrust coefficient $C_{TG}$ is passed as one input to a high thrust bias schedule block 50. Also applied as an input to high thrust bias schedule block 50 is a signal representative of aircraft flap position. High thrust bias schedule 50 operates in accordance with the graph of FIG. 2 to produce an output correction signal $\Delta\alpha$ which is used to correct the stall warning signal for engine thrust. Since this schedule, in the preferred embodiment, may also vary as a function of flap position, two different curves for two different flap positions are developed.

The $\Delta\alpha$ signal out of high thrust bias schedule block 50 is passed to the "false" input of a switch 60. Passed to the "true" input of switch 60 is a signal representative of a $\Delta\alpha$ of 0°. Applied to the control input of switch 60 is the output from circuitry, collectively indicated at 70, which determines whether or not both engines on the aircraft are developing minimum thrust levels. The circuitry 70 includes a comparator block 72 which receives the $N_2$ signal as developed from the second of the two aircraft's engines. The output from the comparator block 72 is a logic level related to whether or not the second engine is developing less than a reference $N_2$ of 75%. A similar signal "$N_1$ $_{VALID}$" is developed for the aircraft's first engine. These engine status signals are routed to the inputs of a logic gate 74 which produces a low level output only in the event that the aircraft's engines are producing a minimum thrust level. In this event, the switch 60 is activated to its "false" position, whereby the developed signal $\Delta\alpha$ is passed to the output of switch 60. In the event that either of the aircraft's engines are developing less than a required level, switch 60 is activated to its true position, whereby a 0 level $\Delta\alpha$ signal is applied at the output of switch 60.

The output from switch 60 is applied to one input of a "SELECT HIGH" block 80. Applied to the remaining input of SELECT HIGH block 80 is a developed worst case warning signal $\alpha_{wc}$. If the aircraft is operating with an asymmetrical flap deployment, a stall condition can occur at a lower aircraft angle of attack. The signal $\alpha_{wc}$ is selected such that in the event of an asymmetrical flap deployment, a stall warning will be given in advance of a stall condition.

The $\alpha_{wc}$ signal is developed from a flap position schedule block 90 and a switch block 92. The flap position block 90 receives a signal corresponding to flap position at an input and produces an output signal which is a scheduled worst case $\alpha_{wc}$ as a function of flap position. This signal is passed to the "true" input of switch 92, which receives a representative 0° signal level at its "false" input. If circuitry, depicted in FIG. 4 as indicating a (default) slat anomaly, determines that there is an asymmetrical flap deployment, switch 92 is activated to its "true" position, thereby passing the $\alpha_{wc}$ signal to the "SELECT HIGH" block 80. Otherwise, the 0 level signal is passed to SELECT HIGH block 80.

The SELECT HIGH block 80 passes the higher of the two signals at its inputs to the negative input of a summer 110. Assuming that the aircraft is not in a condition to flap asymmetry, and that both engines are producing the required minimum thrust level, the signal applied to the negative input of summer 110 will be the $\Delta\alpha$ signal out of the high thrust bias schedule block 50.

Applied to the positive input of summer circuit 110 is an $\alpha$ LIMIT signal which is produced by the normal trip schedule block 120. Normal trip schedule block 120 receives as an input flap position and operates to produce a conventional stall warning limit signal, $\alpha_{LIMIT}$, as a function of flap position.

Thus, the signal out of the summer circuit 110 is the difference between the standard $\alpha_{LIMIT}$ signal and the signal $\Delta\alpha$. This signal is then subtracted, in a summer circuit 130, from a signal $\alpha_{VANE}$ which is the signal produced by the aircraft's angle of attack vane. If the aircraft's actual angle of attack exceeds the stall warning reference signal which is equal to the standard limit signal $\alpha_{LIMIT}$ minus the signal $\Delta\alpha$, this indicates that the aircraft is in a near stall condition and a stick shaker alert should be given. The stick shaker alert is developed by means of a "GREATER THAN 0" circuit 140 which produces an output logic level in response to the angle of attack signal $\alpha_{VANE}$ exceeding the difference between the $\alpha_{LIMIT}$ signal and the signal $\Delta\alpha$. The output from the GREATER THAN 0 block 140 is applied at one input to a logic OR gate 150. Applied to the remaining input to OR gate 150 is the output from a "GREATER THAN 0" block 160. In the event that the $N_1$ signal fails, as a backup to the described stall warning signal system, circuitry, indicated generally at 170, produces a stick shaker signal in the event that the aircraft's caibrated airspeed falls below a scheduled level.

A "MINIMUM CALIBRATED AIRSPEED" block 172 receives an input signal representative of flap position. A schedule within the MINIMUM CALIBRATED AIRSPEED block 172 produces an output signal corresponding to the minimum airspeed allowed at that flap position. Subtracted from the minimum airspeed signal, in a summer 174, is a signal representative of the aircraft's actual calibrated airspeed. If the output from the summer 174 is greater than 0, indicating that the aircraft is flying below the scheduled airspeed, the GREATER THAN 0 block 160 produces a logical input to the OR gate 150.

Thus, if the OR gate 150 receives an output from either the GREATER THAN 0 block 140 or the GREATER THAN 0 block 160, it produces an output to the "false" input of a switch 180.

Applied to the "true" input of switch 180 is a reference 0 level signal. If suitable circuitry (not shown) such as a "squat" switch indicates that the aircraft is on the ground, switch 180 is activated to its true position, whereby a 0 level signal is passed to the output. However, once the aircraft is airborne, switch 180 passes the signal out of OR gate 150, thereby allowing a stall warning signal to be passed to the standard "stick shaker" circuitry, not shown. This, then, alerts the pilot of a near stall condition.

In summary, an improved aircraft stall warning system has been described in detail. The described stall warning system takes into account engine thrust level to produce a stall warning advance which is essentially invariant with thrust level. In this way, the aircraft is maintained within its minimum speed envelope over all engine power settings.

Whereas a preferred embodiment of the invention has been described in detail, it should be apparent that many modifications and variations thereto are possible, all of which fall within the true spirit and scope of the invention.

We claim:

1. Apparatus for producing an aircraft stall warning signal comprising:
   a means for producing a signal a representative of aircraft angle of attack;
   $\Delta\alpha$ means for producing a signal $\Delta\alpha$ which is predeterminedly related to engine thrust level; and
   comparator means for comparing said a and said $\Delta\alpha$ signals and producing a stall warning signal in response to a predetermined relationship therebetween.

2. The apparatus of claim 1 wherein said $\Delta\alpha$ means comprises:
   $C_{TG}$ means for producing a signal $C_{TG}$ representative of aircraft gross thrust coefficient; and
   means for producing said $\Delta\alpha$ signal as a predetermined function of said $C_{TG}$ signal.

3. The apparatus of claim 2 wherein said $C_{TG}$ means further comprises:
   $T_G$ means for producing a signal representative of aircraft gross thrust;
   s means for producing a signal s representative of aircraft wing area;
   means for dividing said $T_G$ signal by said signal s to produce a signal $T_{G/s}$;
   q means for producing a signal q representative of aircraft dynamic pressure; and means for dividing said $T_{G/s}$ signal by said signal q to produce said signal $C_{TG}$.

4. The apparatus of claim 3 wherein said q means further comprises:
$V_{CAS}$ means for producing a signal $V_{CAS}$ representative of aircraft calibrated airspeed;
squarer means for squaring said $V_{CAS}$ signal to produce a signal $V^2_{CAS}$;
means for producing a signal k representative of a conversion constant between said signal $V^2_{CAS}$ and aircraft dynamic pressure; and
means for dividing said $V^2_{CAS}$ signal by said signal k to produce said signal q.

5. The apparatus of claim 1 further comprising:
means for detecting a reduction in thrust of said aircraft below a predetermined level and producing a predetermined thrust detector signal in response thereto; and
means responsive to a produced thrust detector signal for inhibiting said signal $\Delta\alpha$ from affecting the production of said stall warning signal by said comparator signal.

6. The apparatus of claim 1 further comprising:
control surface detector means for producing a control surface detector signal responsive to an aircraft condition of asymmetrical control surface deployment;
means for producing a predetermined worst case stall warning signal $\alpha_{wc}$ in response to a produced control surface detector signal; and
selector means for providing said comparator means for comparison with said signal a the higher of said $\Delta\alpha$ and $\alpha_{wc}$ signals.

7. The apparatus of claim 6 further comprising:
$\alpha_{LIMIT}$ means for producing a signal $\alpha_{LIMIT}$ representative of a limit value aircraft angle of attack as a function of flap deployment; and
means for predeterminedly summing said $\alpha_{LIMIT}$ signal with the higher of said $\Delta\alpha$ and $\alpha_{WC}$ signals provided by said selector means so that a resultant signal produced by said summing means is provided to said comparator means, for comparison with said signal $\alpha$.

8. The apparatus of claim 1 further comprising:
means for producing a signal $V_{CASMIN}$ representative of a predetermined minimum allowed aircraft calibrated airspeed;
means for producing a signal $V_{CAS}$ representative of aircraft calibrated airspeed; and
means for producing said stall warning signal responsive to the condition $V_{CASMIN} > V_{CAS}$.

9. The apparatus of claim 8 wherein said signal $V_{CASMIN}$ is produced as a predetermined function of aircraft flap position.

* * * * *